(12) United States Patent
Funkhouser et al.

(10) Patent No.: US 7,238,229 B2
(45) Date of Patent: Jul. 3, 2007

(54) METHODS AND COMPOSITIONS FOR CEMENTING IN WELL BORES

(75) Inventors: Gary P. Funkhouser, Duncan, OK (US); Larry S. Eoff, Duncan, OK (US); Lewis R. Norman, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 236 days.

(21) Appl. No.: 10/903,772

(22) Filed: Jul. 30, 2004

(65) Prior Publication Data

US 2005/0038164 A1 Feb. 17, 2005

Related U.S. Application Data

(62) Division of application No. 10/231,971, filed on Aug. 30, 2002, now Pat. No. 6,799,636.

(51) Int. Cl.
*C08K 3/26* (2006.01)
(52) U.S. Cl. .......................... 106/35; 523/116
(58) Field of Classification Search ............... 523/115, 523/116; 106/600, 35
See application file for complete search history.

(56) References Cited

U.S. PATENT DOCUMENTS

| 3,066,112 | A | * | 11/1962 | Bowen |
| 3,179,623 | A | * | 4/1965 | Bowen |
| 3,194,784 | A | * | 7/1965 | Bowen |
| 3,740,850 | A | * | 6/1973 | Bowen et al. |
| 3,751,399 | A | * | 8/1973 | Lee et al. |
| 3,926,906 | A | * | 12/1975 | Lee II et al. |
| 4,209,434 | A | * | 6/1980 | Wilson et al. |
| 4,234,344 | A | | 11/1980 | Tinsley et al. ............... 106/88 |
| 4,243,578 | A | * | 1/1981 | O'Sullivan et al. |
| 4,484,949 | A | | 11/1984 | Potter et al. ............... 106/798 |
| 5,276,068 | A | * | 1/1994 | Waknine ................... 522/28 |
| 5,335,726 | A | | 8/1994 | Rodrigues ................ 166/295 |
| 5,367,002 | A | * | 11/1994 | Huang et al. ............... 523/116 |
| 5,444,104 | A | * | 8/1995 | Waknine ...................... 522/24 |
| 5,962,550 | A | * | 10/1999 | Akahane et al. ............ 523/116 |
| 6,043,296 | A | | 3/2000 | Davies et al. ............... 523/116 |
| 6,143,069 | A | | 11/2000 | Brothers et al. ............ 106/678 |
| 6,180,688 | B1 | * | 1/2001 | Rheinberger et al. ....... 523/116 |
| 6,326,417 | B1 | * | 12/2001 | Jia ............................. 523/116 |
| 6,367,549 | B1 | | 4/2002 | Chatterji et al. ............ 166/292 |
| 6,455,608 | B1 | * | 9/2002 | Jia et al. .................... 523/115 |
| 6,730,715 | B2 | * | 5/2004 | Jia ............................. 523/115 |

FOREIGN PATENT DOCUMENTS

EP 967956 A1 1/2000

OTHER PUBLICATIONS

Article entitled "A preliminary investigation of glass polyalkenoate cements based on waste gasifier slags" by A. Sullivan, et al., Journal of Materials Science Letters, pp. 323-325, 2000.
Article entitled "Cementitious Properties of Slags from the British Gas/Lurgi Slagging Gasifier" by P. J. Nixon, et al., Silicates Industriels pp. 253-262, 1983.
Article entitled "Glass-ionomer dental restoratives" by Bill M. Culbertson, Progress in Polymer Science, pp. 577-604, 2001.
3M brochure entitled "Speciality Materials For the Oil & Gas Industry", undated.
Article entitled "Influence of poly(acrylic acid) molar mass on the fracture properties of glass polyalkenoate cements based on waste gasifier slags," by A. Sullivan, et al., Journal of Materials Science, pp. 1125-1134, 2000.
Halliburton brochure entitled "Hi-Dense® Weight Additives", 1998.
Halliburton brochure entitled "Spherelite Cement Additive", 1999.
Office Action dated Feb. 23, 2004 for U.S. Appl. No. 10/231,971.

* cited by examiner

*Primary Examiner*—Paul Marcantoni
(74) *Attorney, Agent, or Firm*—Craig W. Roddy; Baker Botts

(57) ABSTRACT

Methods of cementing in well bores using cement compositions having elasticity or high compressive strength and low permeability are provided. The cement compositions basically include particulate acid-degradable glass, water, at least one water-soluble polymerizable alkenoic acid monomer, and a water-soluble free-radical initiator.

34 Claims, No Drawings

METHODS AND COMPOSITIONS FOR CEMENTING IN WELL BORES

CROSS-REFERENCE TO RELATED APPLICATION

This application is a divisional patent application of commonly-owned U.S. patent application Ser. No. 10/231,971, filed Aug. 30, 2002, now U.S. Pat. No. 6,799,636 entitled "Methods and Compositions for Cementing in Well Bores," by Gary P. Funkhouser, et al., which is incorporated by reference herein for all purposes.

BACKGROUND

The present invention relates generally to methods and compositions for cementing in well bores.

Hydraulic cement compositions are commonly used in subterranean well completion and remedial operations. For example, hydraulic cement compositions are used in primary cementing operations whereby pipe strings such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hard substantially impermeable cement therein. The cement sheath physically supports and positions the pipe string in the well bore and bonds the exterior surfaces of the pipe string to the walls of the well bore, whereby the undesirable migration of fluids between zones or formations penetrated by the well bore is prevented.

Multi-lateral wells have been developed which include vertical or deviated principal well bores having one or more ancillary laterally extending well bores connected thereto. Drilling and completion equipment is available which allows multiple-laterals to be drilled from a principal cased and cemented well bore. Each of the lateral well bores can include a liner cemented therein which is tied into the principal well bore.

While conventional hydraulic cement compositions, which usually include a hydraulic cement (e.g., Portland cement), water, and various conventional cement additives, have been used successfully in primary cementing and other well cementing applications, in some well cementing applications, a cement composition that upon setting has a higher compressive strength and lower permeability than conventional hydraulic cement compositions is desirable. Examples of such well cement applications include, but are not limited to, cemented multi-lateral junctions; kick-off or whip-stock plugs that are placed in a well bore to deflect the drill bit of a drill string and start directional drilling; cement plugs set on top of mechanical bridge plugs used to shut-off lower zones; plugs set in well bores to seal the well bores when the wells are abandoned; and in remedial applications, such as squeeze cementing, where a cement composition is placed with sufficient pressure into cracks, holes or other openings in casings or liners, cement sheaths sealing the liners in the well bore, or the like.

SUMMARY

The present invention provides improved methods and compositions for cementing in well bores.

In one embodiment, the present invention provides a cement composition comprising a particulate acid-degradable glass, sufficient water to form a slurry, at least one water-soluble polymerizable alkenoic acid monomer, and a water-soluble free-radical initiator.

In another embodiment, the present invention provides a cement composition comprising a particulate acid-degradable glass, sufficient water to form a slurry, and at least one water-soluble polyalkenoic acid.

In another embodiment, the present invention provides a cement composition comprising sufficient water to form a slurry and a particulate acid-degradable glass.

The objects, features and advantages of the present invention will be readily apparent to those skilled in the art upon a reading of the description of preferred embodiments that follows.

DESCRIPTION

The present invention provides improved methods and compositions for cementing in subterranean zones penetrated by well bores. In certain embodiments, the cement compositions can be elastic or they can have very high compressive strength and very low permeability. The methods and cement compositions of this invention are useful in a variety of well cementing applications, such as cementing multi-lateral junctions; forming kick-off or whip-stock plugs in well bores, e.g., to deflect drill bits and start directional drilling; cementing bridge plugs in well bores to shut off lower zones; cementing well bores to form plugs therein, e.g., when the well bores are abandoned; and remedial applications in well bores, such as those wherein holes, cracks and the like in casing are repaired by squeeze cementing techniques. In one embodiment, a quick-setting cement composition of this invention comprises a particulate acid-degradable glass, sufficient water to form a slurry, and a water-soluble polyalkenoic acid. The polyalkenoic acid reacts with the particulate acid-degradable glass, and relatively quickly sets and forms a strong relatively impermeable set cement.

An improved cement composition of this invention which can be used in applications in which the set of the cement composition must be delayed to allow its placement in a subterranean zone comprises a particulate acid-degradable glass, sufficient water to form a slurry, at least one water-soluble polymerizable alkenoic acid monomer, and a water-soluble free-radical polymerization initiator. In certain embodiments, the presence of the at least one water-soluble polymerizable alkenoic acid monomer and the water-soluble free-radical polymerization initiator may be optional depending upon the application.

Particulate acid-degradable glasses that are suitable for use in conjunction with the present invention are different from well-known soda-lime glass. Acid-degradable glass, generally, is a calcium alumino silicate material, which is a commercially-available glass that is mixed with fluoride and oftentimes used in dental applications. The fluoride in the acid-degradable glass used by dentists is for preventing tooth decay and is not necessary in well applications. Calcium alumino silicate glass is also available as a slag by-product from coal gasification processes. As the name implies, acid-degradable glasses are degraded by and react with certain acids when in contact therewith. In certain embodiments, the acid-degradable glass is present in the cement compositions of the present invention in an amount in the range of from about 2.5% to about 85% by weight of the composition.

The water in the cement compositions of this invention can be fresh water or salt water. The term "salt water" used herein includes unsaturated salt solutions and saturated salt solutions, such as brines and seawater. In certain embodiments, the water is present in the cement compositions of the present invention in an amount sufficient to form a slurry. In some embodiments, the water is present in the cement compositions in an amount in the range of from about 10% to about 40% by weight of the compositions.

Suitable water-soluble polyalkenoic acids that may be used in the cement compositions of the present invention include, but are not limited to, homopolymers or copolymers of acrylic acid, methacrylic acid, itaconic acid, maleic acid, and 3-butene-1,2,3-tricarboxylic acid. Of these, polyacrylic acid or polymethacrylic acid is preferred. In certain embodiments, the polyalkenoic acid is present in the cement compositions in an amount in the range of from about 5% to about 15% by weight of the compositions.

In certain embodiments, the water-soluble polymerizable alkenoic acid monomer or monomers in the delayed-set compositions suitable for this invention can be alkenoic acid monomers selected from the group consisting of acrylic acid, itaconic acid, maleic acid, methacrylic acid, 3-butene-1,2,3-tricarboxylic acid, and mixtures thereof. Of these, acrylic acid or methacrylic acid is preferred. The one or more water-soluble alkenoic acid monomers can be alkenoic acid esters which are delayed by requiring hydrolysis before polymerizing and reacting with the acid-degradable glass. Examples of the alkenoic acid esters which can be used include, but are not limited to, hydroxyethyl acrylate ester, hydroxyethyl methacrylate ester, hydroxypropyl acrylate ester, hydroxypropyl methacrylate ester, and mixtures thereof. Of these, hydroxyethyl acrylate ester is preferred. The one or more water-soluble polymerizable alkenoic acid monomers or esters used are included in the cement compositions of this invention in an amount in the range of from about 5% to about 15% by weight of the compositions.

A variety of water-soluble free-radical polymerization initiators can be used in the delayed-set compositions. A particularly suitable type of free-radical initiator is an azo polymerization initiator. Azo polymerization initiators are defined by the formulas set forth in detail in U.S. Pat. No. 5,335,726, issued to Rodrigues on Aug. 9, 1994, which is incorporated herein by reference thereto. The azo polymerization initiators are commercially available from Wako Pure Chemical Industries, Ltd. of Osaka, Japan and Wako Chemicals USA, Inc. of Richmond, Va. The azo initiators have 10 hour half-lives at temperatures ranging from about 110° F. to about 220° F. Accordingly, by determining the temperature of the formation into which the cement composition of this invention is to be placed and the required pumping time, an azo initiator type and concentration can be selected for polymerization initiation, which provides an induction period sufficient to allow the cement to be placed.

Particularly suitable azo free radical initiators include, but are not limited to, 1-[(1-cyano-1-methylethyl)azo]formamide (10 hour half life temperature 219° F.), 2,2'-azobis[2-(5-methyl-2-imidazolin-2-yl)propane] dihydrochloride (10 hour half life temperature 106° F.), 2,2'-azobis(2-methylpropionamidine) dihydrochloride (10 hour half life temperature 133° F.), 2,2'-azobis[2-(2-imidazolin-2-yl)propane] dihydrochloride (10 hour half life temperature 111° F.), 2,2'-azobis[2-methyl-N-(2-hydroxy-ethyl)propionamide] (10 hour half life temperature 187° F.), and 4,4'-azobis(4-cyanovaleric acid) (10 hour half life temperature 156° F.).

When an alkenoic acid or a delayed alkenoic acid ester is used in the cement compositions, the water-soluble free-radical initiator can be an oxidizing compound. Examples of such oxidizing free-radical initiators include, but are not limited to, sodium persulfate, ammonium persulfate, t-butylhydroperoxide, and hydrogen peroxide with or without a reducing agent selected from the group consisting of sodium thiosulfate, sodium bisulfite, and triethanolamine.

Generally, the water-soluble free-radical initiator used is present in the cement compositions in an amount in the range of from about 0.001% to about 0.25% by weight of the compositions.

The quick-set and delayed-set cement compositions can also include a filler comprising silica flour or powdered iron oxide. When used, the filler is present in the cement compositions in an amount in the range of from about 10% to about 1900% by weight of the acid-degradable glass therein. The presence of relatively large amounts of filler in the cement compositions makes the cement compositions elastic. For example, when a cement composition of this invention includes a ratio of iron oxide filler to acid-degradable glass in the range of from about 3:1 to about 19:1, the resulting set cement composition has elastic properties.

The methods of this invention for cementing in a subterranean zone penetrated by a well bore basically comprise the following steps: A cement composition is provided comprising particulate acid-degradable glass, sufficient water to form a slurry, and a polyalkenoic acid, or alternatively when it is necessary to delay the set of the cement composition, at least one water-soluble polymerizable alkenoic acid monomer, and a water-soluble free-radical initiator. The cement composition is placed in a subterranean zone to be cemented and then allowed to set into a strong relatively impermeable set cement mass in the subterranean zone.

The mechanism by which the delayed-set cement compositions of this invention set is as follows. The free-radical polymerization initiator causes the one or more alkenoic acid monomers to polymerize. The resulting alkenoic acid polymer then reacts with the acid-degradable glass to form a strong relatively impermeable set cement mass. While the alkenoic acid monomer or monomers may react with the acid-degradable glass prior to the polymerization, that reaction does not cause a set.

A preferred method of this invention for cementing in a subterranean zone penetrated by a well bore where a quick-set is required comprises the following steps: (a) providing a cement composition comprising particulate acid-degradable glass, sufficient water to form a slurry, and a water-soluble polyalkenoic acid; (b) placing the cement composition in the subterranean zone; and (c) allowing the polyalkenoic acid to react with the acid-degradable glass and set into a strong relatively impermeable set cement mass in the zone.

Another preferred method of the present invention for cementing in a subterranean zone penetrated by a well bore where a delayed-set is required comprises the following steps: (a) providing a cement composition comprising particulate acid-degradable glass, sufficient water to form a slurry, at least one water-soluble polymerizable alkenoic acid monomer, and a water-soluble free-radical initiator; (b) placing the cement composition in the subterranean zone; and (c) allowing the free-radical initiator to cause the alkenoic acid monomer to polymerize and react with the acid-degradable glass and set into a strong relatively impermeable set cement mass in the zone. In certain embodiments, the presence of the at least one water-soluble polymerizable alkenoic acid monomer and the water-soluble free-radical polymerization initiator may be optional depending on the application.

A preferred well cement composition of this invention comprises particulate acid-degradable glass, sufficient water to form a slurry, at least one water-soluble polymerizable alkenoic acid monomer, and a water-soluble free-radical initiator. In certain embodiments, the presence of the at least one water-soluble polymerizable alkenoic acid monomer and the water-soluble free-radical polymerization initiator may be optional depending on the application.

To facilitate a better understanding of the present invention, the following examples of certain embodiments are given. In no way should the following examples be read to limit, or define, the scope of the invention.

EXAMPLE 1

A cement composition was prepared by combining a 30% by weight water-solution of a copolymer of acrylic acid and itaconic acid having a weight ratio of acrylic acid to itaconic acid of 7:3 with particulate acid-degradable glass. The particulate acid-degradable glass was combined with the copolymer solution in a weight ratio of copolymer solution to particulate acid-degradable glass of 1:1. The resulting composition was cured for 24 hours at 73° F. after which the composition was tested for compressive strength. The test result was that the composition had a compressive strength of 2,912 psi.

EXAMPLE 2

A first cement composition of this invention was prepared by dissolving a methacrylic acid monomer in water in an amount to produce an aqueous solution containing 30% by weight methacrylic acid. An azo initiator, i.e., 2,2'-azobis (2-methylpropionamidine) dihydrochloride was added to the monomer solution in an amount equivalent to 40 pounds of initiator per 1,000 gallons of the monomer solution. Particulate acid-degradable glass was added to the monomer solution in a weight ratio of aqueous solution to particulate acid-degradable glass of 1:1. A second cement composition was prepared which was identical to the first cement composition except that a 1:1 mixture of silica flour and acid-degradable glass was used in place of the acid-degradable glass. The resulting cement compositions were cured for 18 hours at 140° F. after which the set cement compositions were tested for compressive strength. The compressive strength of the first cement composition which did not contain silica flour was 5,343 psi and the compressive strength of the second cement composition containing silica flour was 4,978 psi.

EXAMPLE 3

A first cement composition of this invention was prepared by dissolving acrylic acid monomer in water in an amount to produce an aqueous solution containing 30% by weight acrylic acid. A 2,2'-azobis(2-methylpropionamidine) dihydrochloride initiator was added to the monomer solution in an amount equivalent to 40 pounds of initiator per 1,000 gallons of the monomer solution. Particulate acid-degradable glass was added to the monomer solution in a weight ratio of aqueous solution to particulate acid-degradable glass of 1:1. A second cement composition was prepared that was identical to the first cement composition, except that a 1:1 mixture of silica flour and acid-degradable glass was used in place of the acid-degradable glass. A third cement composition was prepared that was identical to the first cement composition except that a 1:1 mixture of powdered iron oxides and acid-degradable glass was used in place of the acid-degradable glass. The resulting cement compositions were cured for 18 hours 140° F. after which the set cement compositions were tested for compressive strength. The compressive strength of the first cement composition, which did not contain silica flour or powdered iron oxide, was 2,100 psi. The compressive strength of the second cement composition which contained silica flour was 3,170 psi, and the compressive strength of the third cement composition, which contained powdered iron oxide, was 2,920 psi.

EXAMPLE 4

A cement composition was prepared by dissolving acrylic acid in a 0.4% aqueous solution of xanthan gum to produce an aqueous solution containing 30% acrylic acid. 2,2'-azobis (2-methylpropionamidine) dihydrochloride initiator was added to the monomer solution in an amount equivalent to 0.1% w/v. A 95:5 mixture of powdered iron oxides and acid-degradable glass was added to the monomer solution in a weight ratio of aqueous solution to solids of 1:1. The resulting cement composition was cured at 140° F. for 72 hours. The cement was compressed in a load cell to 24% of its original length without failing (730 psi maximum stress based on the original cross-sectional area). Within 1 hour of removing the sample from the load cell, it had recovered 99% of its original length, demonstrating the elastic characteristic of the cement.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition comprising a particulate acid-degradable glass, sufficient water to form a slurry, at least one water-soluble polymerizable alkenoic acid monomer, and a water-soluble free-radical initiator.

2. The cement composition of claim 1 wherein the particulate acid-degradable glass is present in an amount in the range of from about 2.5% to about 85% by weight of the composition.

3. The cement composition of claim 1 wherein the water comprises fresh water, salt water, or a mixture thereof.

4. The cement composition of claim 1 wherein the water is present in an amount in the range of from about 10% to about 40% by weight of the composition.

5. The cement composition of claim 1 wherein the water-soluble polymerizable alkenoic acid monomer is selected from the group consisting of acrylic acid, itaconic acid, maleic acid, methacrylic acid, 3-butene-1,2,3-tricarboxylic acid, and mixtures thereof.

6. The cement composition of claim 1 wherein the water-soluble polymerizable alkenoic acid monomer is acrylic acid, methacrylic acid, or a mixture thereof.

7. The cement composition of claim 1 wherein the water-soluble polymerizable alkenoic acid monomer is an alkenoic acid ester.

8. The cement composition of claim 7 wherein the alkenoic acid ester is selected from the group consisting of hydroxyethyl acrylate ester, hydroxyethyl methacrylate ester, hydroxypropyl acrylate ester, hydroxypropyl methacrylate ester, and mixtures thereof.

9. The cement composition of claim 7 wherein the alkenoic acid ester is hydroxyethyl acrylate ester.

10. The cement composition of claim 1 wherein the water-soluble polymerizable alkenoic acid monomer is present in an amount in the range of from about 5% to about 15% by weight of the composition.

11. The cement composition of claim 1 wherein the water-soluble free-radical initiator is selected from the group consisting of 1-[(1-cyano-1-methylethyl)azo] formamide, 2,2'-azobis[2-(5-methyl-2-imidazolin-2-yl)propane]dihydrochioride, 2,2'-azobis(2-methylpropionamidine) dihydrochioride,2,2'-azobis[2-(2-imidazolin-2-yl)propane] dihydrochloride,2,2'-azobis[2-methyl-N-(2-hydroxyethyl)propionamide], 4,4'-azobis(4-cyanovaleric acid), and mixtures thereof.

12. The cement composition of claim 1 wherein the water-soluble free-radical initiator is selected from the group consisting of sodium persulfate, ammonium persulfate, t-butyl hydroperoxide, and hydrogen peroxide.

13. The cement composition of claim 1 wherein the water-soluble free-radical initiator is selected from the group consisting of sodium persulfate, ammonium persulfate, t-butyl hydroperoxide, and hydrogen peroxide with a reducing agent selected from the group consisting of sodium thiosulfate, sodium bisulfite, and triethanolamine.

14. The cement composition of claim 1 wherein the water-soluble free-radical initiator is present in an amount in the range of from about 0.001% to about 0.25% by weight of the composition.

15. The cement composition of claim 1 wherein the cement composition further comprises a filler selected from the group consisting of silica flour, powdered iron oxide, and mixtures thereof.

16. The cement composition of claim 15 wherein the filler is present in an amount in the range of from about 10% to about 1900% by weight of the acid-degradable glass in the composition.

17. A cement composition comprising a particulate acid-degradable glass, sufficient water to form a slurry, and at least one water-soluble polymerizable alkenoic acid monomer.

18. The composition of claim 17 wherein the particulate acid-degradable glass is present in an amount in the range of from about 2.5% to about 85% by weight of the composition.

19. The cement composition of claim 17 wherein the water comprises fresh water, salt water, or a mixture thereof.

20. The cement composition of claim 17 wherein the water is present in an amount in the range of from about 10% to about 40% by weight of the composition.

21. The cement composition of claim 17 wherein the water-soluble polymerizable alkenoic acid monomer is selected from the group consisting of acrylic acid, itaconic acid, maleic acid, methacrylic acid, 3-butene-1,2,3-tricarboxylic acid, and mixtures thereof.

22. The cement composition of claim 17 wherein the water-soluble polymerizable alkenoic acid monomer is an acrylic acid, a methacrylic acid, or a mixture thereof.

23. The cement composition of claim 17 wherein the water-soluble polymerizable alkenoic acid monomer is an alkenoic acid ester.

24. The cement composition of claim 23 wherein the alkenoic acid ester is selected from the group consisting of hydroxyethyl acrylate ester, hydroxyethyl methacrylate ester, hydroxypropyl acrylate ester, hydroxypropyl methacrylate ester, and mixtures thereof.

25. The cement composition of claim 23 wherein the alkenoic acid ester is hydroxyethyl acrylate ester.

26. The cement composition of claim 17 wherein the water-soluble polymerizable alkenoic acid monomer or ester is present in an amount in the range of from about 5% to about 15% by weight of the composition.

27. The cement composition of claim 17 wherein the cement composition further comprises a filler selected from the group consisting of silica flour, powdered iron oxide, and mixtures thereof.

28. The cement composition of claim 27 wherein the filler is present in an amount in the range of from about 10% to about 1900% by weight of the acid-degradable glass in the composition.

29. A cement composition comprising sufficient water to form a slurry, at least one water-soluble polymerizable alkenoic acid monomer selected from the group consisting of acrylic acid, itaconic acid, maleic acid, methacrylic acid, 3-butene-1,2,3-tricarboxylic acid, and mixtures thereof, and a particulate acid-degradable glass.

30. The cement composition of claim 29 wherein the particulate acid-degradable glass is present in an amount in the range of from about 2.5% to about 85% by weight of the composition.

31. The cement composition of claim 29 wherein the water comprises fresh water, salt water, or a mixture thereof.

32. The cement composition of claim 29 wherein the water is present in an amount in the range of from about 10% to about 40% by weight of the composition.

33. The cement composition of claim 29 wherein the cement composition further comprises a filler selected from the group consisting of silica flour, powdered iron oxide, and mixtures thereof.

34. The cement composition of claim 33 wherein the filler is present in an amount in the range of from about 10% to about 1900% by weight of the acid-degradable glass in the composition.

* * * * *